US008351353B2

(12) United States Patent
Xie et al.

(10) Patent No.: US 8,351,353 B2
(45) Date of Patent: Jan. 8, 2013

(54) FORWARD CHANNEL SHARING METHOD IN TIME DIVISION COMMUNICATION SYSTEM

(75) Inventors: Zhongshi Xie, Shenzhen (CN); Yingnan Liu, Shenzhen (CN); Guo Yang, Shenzhen (CN); Zihua Xu, Shenzhen (CN); Yiling Liu, Shenzhen (CN); Zongzheng Li, Shenzhen (CN)

(73) Assignee: ZTE Corporation (CN)

( * ) Notice: Subject to any disclaimer, the term of this patent is extended or adjusted under 35 U.S.C. 154(b) by 112 days.

(21) Appl. No.: 12/033,852

(22) Filed: Feb. 19, 2008

(65) Prior Publication Data

US 2011/0019688 A9    Jan. 27, 2011

Related U.S. Application Data

(63) Continuation of application No. PCT/CN2006/002253, filed on Sep. 1, 2006.

(30) Foreign Application Priority Data

Sep. 2, 2005 (CN) .......................... 2005 1 0037030

(51) Int. Cl.
*H04L 12/16* (2006.01)

(52) U.S. Cl. ........ 370/261; 370/266; 370/267; 370/321; 370/337; 370/347; 370/389; 370/442; 379/202.01; 379/205.01

(58) Field of Classification Search .................. 370/321, 370/337, 347, 389, 442, 261, 266, 267; 379/202.01, 379/205.01
See application file for complete search history.

(56) References Cited

U.S. PATENT DOCUMENTS

| | | | | |
|---|---|---|---|---|
| 5,319,707 | A * | 6/1994 | Wasilewski et al. | 380/212 |
| 6,373,829 | B1 | 4/2002 | Vilmur | |
| 6,720,864 | B1 * | 4/2004 | Wong et al. | 340/7.52 |
| 7,554,945 | B2 * | 6/2009 | Lee et al. | 370/329 |
| 2002/0003812 | A1 * | 1/2002 | Haartsen | 370/474 |
| 2003/0067899 | A9 * | 4/2003 | Chen et al. | 370/335 |
| 2003/0228865 | A1 | 12/2003 | Terry | |
| 2004/0258066 | A1 * | 12/2004 | Chen et al. | 370/390 |
| 2005/0163076 | A1 | 7/2005 | Vannithamby | |
| 2006/0176881 | A1 * | 8/2006 | Ma et al. | 370/392 |
| 2006/0280141 | A1 * | 12/2006 | McBeath et al. | 370/329 |
| 2007/0064692 | A1 * | 3/2007 | Pi et al. | 370/389 |
| 2007/0081500 | A1 * | 4/2007 | Jung et al. | 370/335 |

FOREIGN PATENT DOCUMENTS

| | | |
|---|---|---|
| CN | 1549485 A | 11/2004 |
| CN | 1567793 A | 1/2005 |

* cited by examiner

*Primary Examiner* — Bo Hui A. Zhu
(74) *Attorney, Agent, or Firm* — David R. Stevens; Stevens Law Group

(57) ABSTRACT

A method for realizing forward channel sharing in time division communication system, which completes group configuration at the cluster control service center server and modifies the attributes of all the users to enable the users to support multi-user packet MUP service, including: (a) the cluster user initiates a group call; the access network allocates a unique group identifier MACIndex for the group call after receiving the call request from the calling cluster user and informs all of the users within the group about this MACIndex (201); (b) after the communication starts (202), the access network packets the user data of one or more groups with multi-user packet MUP, packets the user data of each group into one sub-packet and does scheduling, then transmits the packets through forward channel (203); (c) after receiving the MUP packets from the forward channel, the cluster user looks into the MUP packets for the sub-packet that matches the MACIndex of its group, thereby realizing group communication (204). The present method solves the problem of system delay and supports even more groups.

11 Claims, 1 Drawing Sheet

FORWARD CHANNEL SHARING METHOD IN TIME DIVISION COMMUNICATION SYSTEM

TECHNICAL FIELD

The present invention relates to a method for realizing forward channel sharing in wireless communication system, especially relates to a method for realizing forward channel sharing for all the users within the group in time division wireless communication system.

TECHNICAL BACKGROUND

The trunked communication system is a specialized mobile communication system in which multiple users share and dynamically use one group of wireless channels. It is mainly applied in enterprises, security department, police, army etc., which have a high demand for commanding and dispatching functions. According to the technical schemes that are employed in the internal system, the trunked communication system can be divided into analog trunked communication system and digital trunked communication system. At present, the most widely used two types of TDMA (Time Division Multiple Access) digital trunked communication systems are iDEN (integrated Digital Enhanced Network) digital trunked communication system and terrestrial trunked Radio TETRA (Trans European Trunked Radio) communication system.

The above two types of trunked networks are both realized by using the second generation digital communication technology and the multi-address scheme of TDMA. However, with the ever mature third generation communication technology nowadays, TDMA scheme has such shortcomings as being unable of 3G smooth evolution, limited capacity, low success rate of switching and low data throughput, so it can not meet the ever increasing demands of communication.

CDMA system has broadband spread spectrum air interface, and it has successfully realized trunked service in CDMA2000 1x CDMA2000 HRPD (High Rate Packet Data) not only provides high speed packet data service, but also provides VOIP service. If combining the CDMA2000 HRPD technology and the trunked system together, it will not only exert the technical advantage of CDMA2000 HRPD, but also meet the user's demand of trunked service, such as trunked calling and group calling etc.

Within the time division wireless communication system, the common way of realizing trunking is to allocate fixed time slots to specialized groups. However, this technology has the following problem: when the number of the groups is increasing, the time delay problem will become more and more severe which will significantly affect the voice communication quality as well as the user's feeling; meanwhile, due to the limited data contents within each voice data packet, the fixed time slot distributed to each user will waste a large amount of bandwidths, as a result, other services can not be normally processed when more groups need to be supported.

SUMMARY OF THE INVENTION

The technical problem to be solved in the present invention is to provide a method for realizing forward channel sharing in time division communication system. It solves the problem of severe system time delay and bandwidth waste due to the increasing number of groups that exists in the prior art.

In order to solve the above technical problem, the present invention offers a method for realizing forward channel sharing in time division communication system. Said time division communication system includes cluster users, an access network and a cluster control center server. It completes group configuration at said cluster control center server and modifies the attributes of all the users in the group to enable the users to support multi-user packet MUP service, comprising the following steps of:

(a) the cluster user initiates a group call; the access network allocates a unique group identifier MACIndex to the group call after receiving the call request from the calling cluster user and informs all the users in the group about this MACIndex;

(b) after the communication starts, the access network packets the user data of one or more groups with multi-user packet MUP, packets the user data of each group into one sub-packet, and does scheduling, then transmits the packets through a forward channel;

(c) after receiving the MUP packets from the forward channel, the cluster user looks into the MUP packets for the sub-packet that matches the MACIndex of its group, thereby realizing group communication.

Further, said method also comprises the following characteristic: when the cluster user communicates with the access network for the first time, during the process of the negotiation between the access network and the terminal, the access network determines whether the cluster user is enabled to support MUP service according to the negotiation content, if not, it does session negotiation with the cluster user to enable the cluster user to support MUP service.

Further, said method also comprises the following characteristic: in said step (a), the access network informs all the users in the group about the MACIndex through a traffic channel assignment message.

Further, said method also comprises the following characteristic: in said step (b), the access network packets a certain quantity of user data within the same group into a sub-packet in order and packets the sub-packets of one or more groups into a MUP packet.

Further, said method also comprises the following characteristic: in said step (c), the cluster user terminal monitors the forward channel and demodulates the multi-user data packet received, if it determines the received packet is an MUP packet, it will do matching for each sub-packet in the MUP packet.

Further, said method also comprises the following characteristic: in said step (c), if the cluster user does not receive the data sub-packet that matches the MACIndex of its group, it discards said MUP packet and waits for the MUP packet of the next time slot.

Further, said method also comprises the following characteristic: said sub-packet comprises the MACIndex, sub-packet length and packet data of the group to which it belongs.

Further, said method also comprises the following characteristic: the sub-packet length can be set flexibly.

Further, said method also comprises the following characteristic: the header of said MUP packet uses MACIndex (66-70) as identifier.

Further, said method also comprises the following characteristic: said MUP packet is transmitted in one or more time slots.

By using the forward-channel based MUP (multi-user-packet) technology and employing the method of combining time division scheme and multi-packets scheme, the present invention realizes that users in a group fully share the forward channel through a sub-packet within the MUP. Meanwhile, this invention realizes that different groups fully share a forward time slot through the multi-user packets within a time slot of the forward channel, so it effectively solves the problem of system time delay, makes a better use of bandwidth resources and increases the number of forward packets and the number of users within a group, namely, increases the number of groups of each time-slot and the number of users within each group. Since the VOIP voice packet is usually small, this invention enables the user data of more group to be transmitted within a time slot, and MUP in different time slots can carry the data packets of the same or different group so that the system is able to support more groups and the number of users in the group in forward direction is not limited.

PREFERRED EMBODIMENT OF THIS INVENTION

In the following text, the method of this invention will be further described in detail in combination with the drawings and the specific embodiment. The present invention can be applied to all the time division communication systems that support MUP technology, such as TD-SCDMA, CDMA2000 1x. The present embodiment takes the CDMA based trunked communication system as an example.

By using the feature that the cluster users share the forward channel and the fact that the voice packets are usually small, the present embodiment proposes a method for realizing forward channel sharing based on the multi-user packet (MUP) technology, in which, one forward data packet includes multiple sub-packets, each sub-packet corresponds to one group, and different groups are identified by different indexes, thereby one data packet includes the data of multiple groups and finally the forward channel sharing is realized.

In CDMA 2000 HRPD RevA, MUP technology refers to carrying the information of multiple users (including voice data or multi-media data) in a physical time slot (1.667 ms); the user demodulates the contents of its own from the MUP packet according to the MACIndex that the system has distributed to itself. When using the MUP technology to realize group communication, each sub-packet in MUP does not belong to a single user any more, instead it belongs to the entire group, in other words, the initial unique MACIndex for identifying a single user is no longer just an identifier for a user in the present embodiment, instead it is a unique identifier for a group (called as a group identifier), namely one MACIndex represents one group. Correspondingly, one MUP can carry the data packets of multiple groups (including voice data or multimedia data, the same below), and each group corresponds to one sub-packet in MUP (designated by MACIndex).

Figure 1:
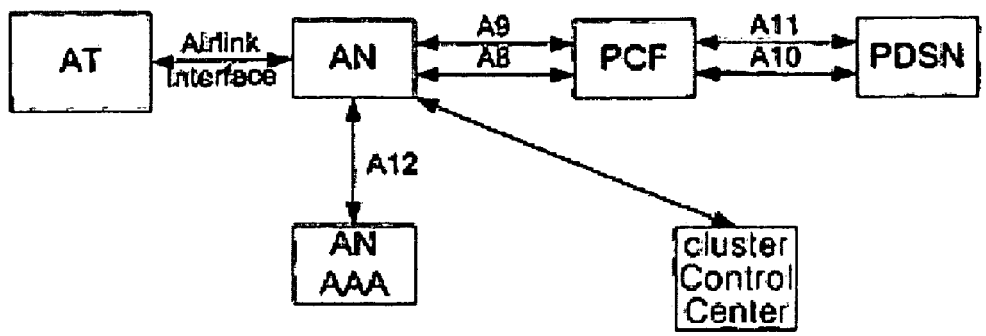
FIG. 1 is the structural diagram of the CDMA2000 HRPD based trunked system in the present embodiment.

As shown in FIG. 1, CDMA2000 HRPD system comprises an access terminal AT, an access network AN, an access network authentication authorization and accounting AN AAA, a cluster control service server, a packet control function PCF, and a packet data service node PDSN; A9, A11 and A12 are signaling links, A8 and A10 are data links, and AT is the (cluster) user of the present embodiment.

Before the process of group call, the following configurations need to be done in advance:

1. at the cluster control center server which connects with the access network, the groups are preset, the cluster user is added into the corresponding group, and the group information is saved;

the operations of grouping, adding and deleting users for the cluster control center server which saves the group information can be performed through the background for operating and maintaining.

2. when the cluster user communicates with the access network for the first time, the access network determines whether the cluster user is enabled to support MUP during the process of the negotiation between the access network and the terminal according to the negotiation contents, if not, the access network performs session negotiation with the cluster user to enable the user to support MUP.

Enabling MUP means MUP service is supported in the user's attribute, which is configured at the background operation maintenance center of the access network. The attribute of the cluster user is directly modified as MUP service supporting without any preconditions, and the attribute will be always valid after it is modified.

The process of enabling MUP supporting usually happens when the user terminal communicates with the access network for the first time. For example, a new bought cell phone will go for session negotiation with the system after booting, or when the session information saved in the cell phone is lost (lose the connection with the system), the session negotiation process will also be initiated.

Figure 2:
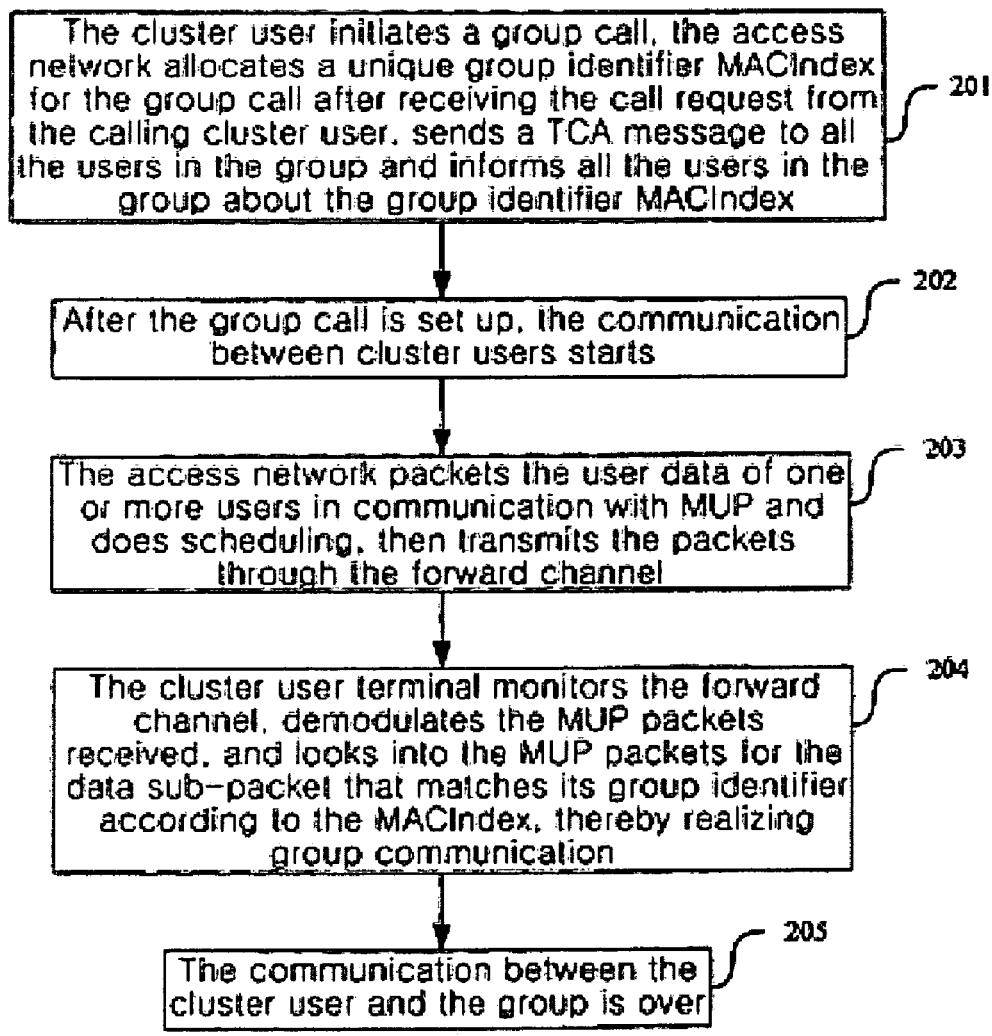
FIG. 2 is the flow chart of sharing the forward channel in the present embodiment.

The flow chart of sharing the forward channel in the present embodiment is shown in FIG. 2, comprising the following steps:

Step 201, the cluster user initiates a group call, the access network allocates a unique group identifier MACIndex for said group call after receiving the call request from the calling cluster user, meanwhile, the access network sends a TCA traffic Channel Assignment) message to all the users in the group and informs all the users in the group about the group identifier MACIndex;

The access network allocates different MACIndexes for different groups and allocates the same MACIndex for the users within the same group.

Step 202, the communication between cluster users starts after the group call has been set up;

Step 203, the access network packets the user data of one or more groups in communication with multi-user packet MUP, then does a scheduling and transmits the packets in the forward channel;

The access network packets a certain quantity of voice frames in order (in sequence order or priority order), the voice frames in the same group are packeted into one sub-packet, the header of the sub-packet is the corresponding MACIndex of its group, besides that, the sub-packet also includes sub-packet length and packet data. The sub-packets of different groups are packeted into MUP in a continuous sequence, meanwhile, for MUP packet, a special MACIndex (66-70) used as the prefix of the forward data packet is packeted into the header of MUP to be an identifier to inform the users that this is a MUP packet rather than a common single user packet. Therefore the sequence order of the contents of MUP is: MUP prefix and the corresponding sub-packets of different groups, the sub-packet includes the prefix of each group in MUP, the sub-packet length of each group in MUP, and the packet data of each group in MUP, and of course, the corresponding filling fields are required in the tail of the MUP packet. If there is only one group service during packeting, it is feasible to packet only for the users of one group, at this time, said MUP only has one sub-packet while it is still a MUP packet and has a MUP identifier.

Each group always corresponds to one sub-packet in the MUP, in other words, the length of the sub-packet can be set flexibly. When there are many voice frames in one group, these voice frames are still packeted into one sub-packet of one MUP, only that the length of the sub-packet becomes longer.

Step 204, the cluster user terminal monitors the forward channel, demodulates the multi-user packets received, and looks into the MUP packets for the data sub-packet (such as VoIP packet) that matches the identifier of its group according to the MACIndex distributed by the access network, thereby realizing the group communication;

The demodulation referred here can be the existing demodulation method, so no more details will be discussed here.

The cluster user first determines whether the packet received is multi-user packet (according to whether MACIndex is in the range of 66-70), then it does the matching for each sub-packet in the multi-user packet until it finds the sub-packet that matches its MACIndex. If no matched sub-packet is found, the user will wait for the forward multi-user packet in the next time slot. One MUP packet may possibly not finish transmission within one time slot and may occupy several time slots. The user terminal will automatically demodulate the MUP packets in the remained time slots.

Due to the same MACIndex, the different users within the same group can receive the data packet sub-packets of this group simultaneously, thereby realizing the forward channel sharing and the group communication.

All the MUP packets under one base station are transmitted on one shared forward channel, so the users may receive unrelated MUP packets. The user terminal will monitor the channel, receive all of the MUP packets and determine whether there is sub-packet of its own, if not, discard the packets.

Step 205, the communication between the cluster user and the group is over.

INDUSTRIAL APPLICABILITY

By using the forward-channel based MUP technology and employing the method of combining time division scheme and multi-packet scheme, the present invention realizes that users in a group fully share the forward channel through a sub-packet within the MUP. Meanwhile, this invention realizes that different groups fully share a forward time slot through the multi-user packets within a time slot of the forward channel, so it effectively solves the problem of system time delay, makes a better use of bandwidth resources and increases the number of forward groups and the number of users within a group, namely, increases the number of groups of each time-slot and the number of users within each group. Since the VOIP voice packet is usually small, this invention enables the user data of more groups to be transmitted within a time slot, and MUP in different time slots can carry the data packets of the same or different groups, so that the system is able to support more groups and the number of users in the group in forward direction is not limited.

What we claim is:

1. A method for realizing forward channel sharing in trunked communication in a time division communication system, wherein said time division communication system comprises cluster users for trunked communication, an access network and a cluster control center server, a group configuration for the cluster users is completed at said cluster control center server, and attributes of all the users in the group are modified to enable the users to support multi-user packet (MUP) service, comprising following steps of:
   (a) a cluster user initiates a group call for trunked communication with multiple users, said access network allocates a unique group identifier MACIndex for this group call after receiving a call request from the cluster user, and informs all the users in the group about the MACIndex;
   (b) the communication between cluster users starts after the group call has been set up, the access network packets user data of one or more groups with MUP after the trunked communication starts, packets the user data of each group into one sub-packet of a MUP packet and performs scheduling, then transmits MUP packets through a forward channel; and
   (c) the cluster user looks into the MUP packets for the sub-packet that matches the MACIndex of its group after receiving the MUP packets from the forward channel, thereby realizing the group call in trunked communication.

2. The method of claim 1, wherein when said cluster user communicates with the access network for a first time, said access network determines whether the cluster user is enabled to support MUP service during a process of a negotiation between said access network and a terminal according to content of said negotiation, if not, the access network does a session negotiation with said cluster user to enable the cluster user to support MUP service.

3. The method of claim 1, wherein in said step (a), the access network informs all the users in the group about the MACIndex through a traffic channel assignment message.

4. The method of claim 1, wherein in said step (b), the access network packets user data in the same group into a sub-packet in order and packets the sub-packets of one or more groups into a MUP packet.

5. The method of claim 1, wherein in said step (c), the cluster user terminal monitors the forward channel and demodulates the multi-user data packet received, when the packet received is determined to be a MUP packet, then does a matching for each sub-packet within the MUP packet.

6. The method of claim 1, wherein in said step (c), if the cluster user does not receive a data sub-packet that matches the MACIndex of its group, then the cluster user discards said MUP packet and wait for the MUP packet in a next time slot.

7. The method of claim 1, wherein said sub-packet comprises sub-packet length, packet data, and MACIndex of its group to which it belongs.

8. The method of claim 1, wherein the length of the sub-packet can be set flexibly.

9. The method of claim 1, wherein a header of said MUP packet uses MACIndex 66-70 as identifier.

10. The method of claim 1, wherein said MUP packet is transmitted in one or more time slots.

11. The method of claim 5, wherein in said step (c), if the cluster user does not receive a data sub-packet that matches the MACIndex of its group, then the cluster user discards said MUP packet and wait for the MUP packet in a next time slot.

* * * * *